(12) United States Patent
Potyrailo et al.

(10) Patent No.: US 7,948,385 B2
(45) Date of Patent: May 24, 2011

(54) SYSTEMS AND METHODS FOR USING FERRITE ALIGNMENT KEYS IN WIRELESS REMOTE SENSORS

(75) Inventors: Radislav Alexandrovich Potyrailo, Niskayuna, NY (US); William Guy Morris, Rexford, NY (US); Charles Lucian Dumoulin, Ballston Lake, NY (US); Cheryl Margaret Surman, Albany, NY (US)

(73) Assignee: General Electric Company, Niskayuna, NY (US)

( * ) Notice: Subject to any disclaimer, the term of this patent is extended or adjusted under 35 U.S.C. 154(b) by 350 days.

(21) Appl. No.: 12/330,590

(22) Filed: Dec. 9, 2008

(65) Prior Publication Data

US 2010/0141273 A1    Jun. 10, 2010

(51) Int. Cl.
*G08B 13/14*     (2006.01)
(52) U.S. Cl. ............... 340/572.8; 340/572.1; 340/572.7; 340/539.1; 340/445; 340/448; 324/71.1; 324/600; 324/649; 324/654; 324/655
(58) Field of Classification Search ............... 340/572.8, 340/572.7, 539.1, 531, 445, 448, 572.1; 423/71.1, 423/600, 649, 654, 655; 436/518; 324/71.1, 324/600, 649, 654, 655
See application file for complete search history.

(56) References Cited

U.S. PATENT DOCUMENTS 5,033,295 A * 7/1991 Schmid et al. ............... 73/146.5
(Continued)

FOREIGN PATENT DOCUMENTS

GB     2424349 A    9/2006
(Continued)

OTHER PUBLICATIONS

PCT International Search Report dated Mar. 17, 2010.
(Continued)

*Primary Examiner* — George A Bugg
*Assistant Examiner* — Sisay Yacob
(74) *Attorney, Agent, or Firm* — Eileen W. Gallagher

(57) ABSTRACT

The present invention related to devices and methods for using ferrite alignment keys in wireless remote sensor assemblies. In one aspect, the invention provides wireless resonant sensor assemblies comprising a pick-up coil, a ferrite alignment key positioned in and extending from the pick-up coil, and wireless resonant sensor having a receiving element wherein the pick-up coil and the wireless resonant sensor align upon insertion of the ferrite alignment key into the receiving element. The ferrite alignment key may also be part of a resonant sensor such that insertion of a pick-up coil into a receiving element of the alignment key results in a configuration where the alignment key is positioned in and extended from the pick-up coil. Methods of measuring one or more parameters of a monitoring system are also provided. The insertion of the ferrite alignment key aligns the pick-up coil and wireless resonant sensor thereby increasing sensing of the wireless resonant sensor by the pick-up coil.

25 Claims, 5 Drawing Sheets

U.S. PATENT DOCUMENTS

| | | | |
|---|---|---|---|
| 6,437,551 B1 * | 8/2002 | Krulevitch et al. | 324/71.1 |
| 7,158,033 B2 | 1/2007 | Forster | |
| 7,195,717 B2 | 3/2007 | Ishida et al. | |
| 7,268,688 B2 | 9/2007 | Juds | |
| 7,295,118 B2 | 11/2007 | Jessup et al. | |
| 7,375,636 B1 | 5/2008 | Martin | |
| 7,382,263 B2 | 6/2008 | Danowski et al. | |
| 7,434,731 B2 | 10/2008 | Cargonja et al. | |
| 2004/0233043 A1 | 11/2004 | Yazawa et al. | |
| 2005/0173532 A1 | 8/2005 | Hasebe et al. | |
| 2007/0171073 A1 | 7/2007 | Ariyoshi et al. | |
| 2008/0191693 A1 | 8/2008 | Jones et al. | |

FOREIGN PATENT DOCUMENTS

WO    WO0026884 A1    5/2000

OTHER PUBLICATIONS

Tumanski, "Induction Coil Sensors—A Review", Measurement Science & Technology, 18 (2007) R31-R46.

Potyrailo et al., "Multianalyte Chemical Identification and Quantitation Using a Single Radio Frequency Identification Sensor", Analytical Chemistry, vol. 79, No. 1, Jan. 1, 2007, pp.

Potyrailo et al., Position-independent Chemical Quantitation with Passive 13.56-MHz Radio Frequency Identificatioin (RFID) Sensors, Jun. 8, 2007, pp. 624-628.

* cited by examiner

SYSTEMS AND METHODS FOR USING FERRITE ALIGNMENT KEYS IN WIRELESS REMOTE SENSORS

BACKGROUND

The invention relates generally to systems and methods for using ferrite alignment keys with wireless resonant sensors.

A wireless resonant sensor functions by having a measurable resonance characteristic that varies in correspondence to changes in the environmental condition present at the sensor. When an excitation signal impinges on the sensor, the sensor emits a return signal representative of a state of the resonance characteristic. Measurable resonance characteristics include, electromagnetic resonance frequency, radio frequency, quality factor or bandwidth. In a passive wireless resonant sensor, the excitation signal is generated by a generator located separate and away from the sensor, and the excitation signal is then directed at the remote sensor. In semi-passive and active wireless resonant sensors the sensors rely on the use of onboard power for their operation. In passive, semi-passive, and active wireless sensors, the emitted return signal is detected using a pick-up coil assembly. Examples of the environmental parameters measured by wireless resonant sensors include solution conductivity, pH, temperature, pressure, flow, dissolved gases, metabolic product concentrations, cell viability, and contaminant levels.

In certain applications, an onboard power supply is required to increase sensor sensitivity or for remote signal transmission. This leads to increase size of the sensor. In other applications, ferrite materials have been placed inside the coils of a pick-up coil assembly to increase signal strength.

There remains a need for increased sensor sensitivity and reproducibility of sensor readings for multiparameter measurement applications.

BRIEF DESCRIPTION

In one aspect, the invention provides wireless resonant sensor assemblies comprising a pick-up coil, a ferrite alignment key positioned in and extending from the pick-up coil, and a wireless resonant sensor having a receiving element wherein the pick-up coil and the wireless resonant sensor align upon insertion of the ferrite alignment key into the receiving element. The ferrite alignment key may also be part of a resonant sensor such that insertion of a pick-up coil into a receiving element of the alignment key results in a configuration where the alignment key is positioned in and extended from the pick-up coil.

In another aspect, the invention provides methods for measuring one or more parameters of a monitoring system for example in manufacturing, product supply, or security applications. The methods comprise embedding a wireless resonant sensors of the invention in a monitoring system, inserting a ferrite alignment key positioned in and extending from a pick-up coil into a receiving element of the wireless resonant sensor such that the pick-up coil and the wireless resonant sensor align, sensing the wireless resonant sensor with the pick-up coil, and reading the signal using a reader/writer device coupled to the pick-up coil. The ferrite alignment key may also be embedded in and extended from the wireless sensor such that insertion of a pick-up coil into a receiving element of the alignment key results in a configuration where the alignment key is positioned in and extended from the pick-up coil.

DRAWINGS

These and other features, aspects, and advantages of the present invention will become better understood when the following detailed description is read with reference to the accompanying drawings in which like characters represent like parts throughout the drawings.

FIG. 1 illustrates a representative pick-up coil assembly 10 containing a ferrite alignment key 14 and a corresponding wireless resonant sensor 18.

FIG. 2 is an illustration of a ferrite alignment key 22 comprising a recessed region 24 for inserting into a pick-up coil 26.

FIG. 3 illustrates a pick-up coil 42 and wireless sensor 38 aligned using a lock-and-key alignment of a distal projection of a ferrite alignment key 40.

FIG. 4 illustrates a pick-up coil assembly 44 with a ferrite alignment key 46 that includes an alignment stop surface 48 that corresponds with an alignment stop surface 50 of a receiving element 52.

DETAILED DESCRIPTION

The following detailed description is exemplary and not intended to limit the invention of the application and uses of the invention. Furthermore, there is no intention to be limited by any theory presented in the preceding background of the invention or the following detailed description.

The present invention provides devices, systems, and methods for measuring the response of a wireless resonant sensor to excitation signals. In general, wireless resonant sensor responses are measured with a pick-up coil that is combined with a ferrite alignment key, which aligns the pick-up coil and the wireless resonant sensor. The combination of the pick-up coil and ferrite alignment key in the disclosed pick-up coil assemblies establish an activating device for enhancing a wireless resonant sensor's signal relative to assemblies that do not include the combination of a pick-up coil and ferrite alignment key.

Figure 1:
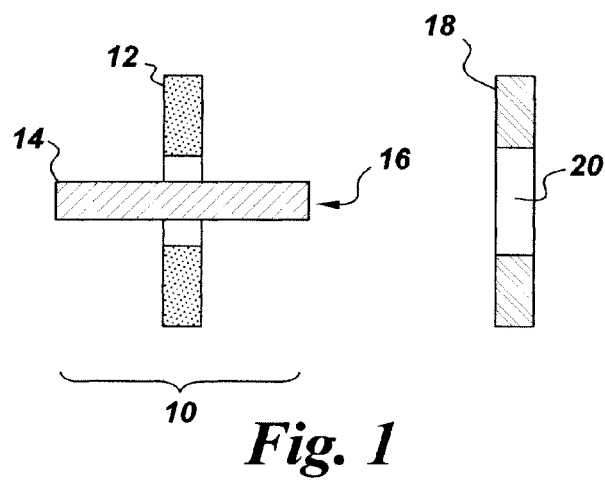

FIG. 1 illustrates one embodiment of a pick-up coil assembly 10 that incorporates aspects of the present invention. The pick-up coil assembly includes a pick-up coil and an energy source for bringing wirelessly energy to a wireless resonant sensor. The pick-up coil assembly may be attached to a reader/writer device (not shown), which serves to transfer data to and from a corresponding wireless resonant sensor and a data processor. As illustrated, the pick-up coil assembly 10 is comprised of a pick-up coil 12 and a ferrite alignment key 14 positioned within the pick-up coil. The ferrite alignment key extends from the pick-up coil as distal projection 16.

The pick-up coil assembly may be paired with a corresponding wireless resonant sensor 18 that has a receiving element 20 configured to accept the distal projection of the ferrite alignment key.

Figure 2:
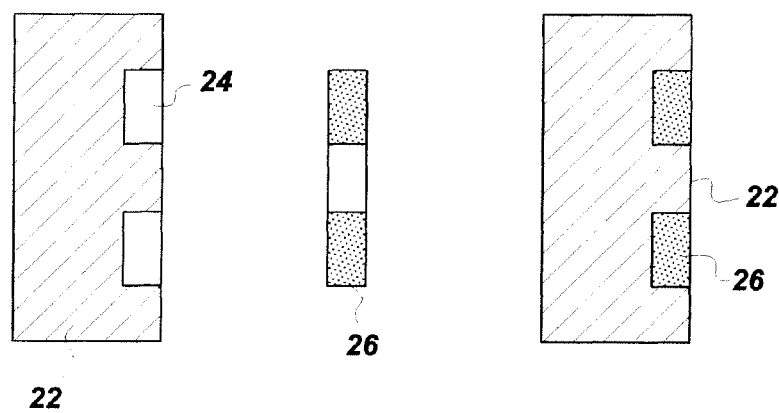

The ferrite alignment key may be configured for insertion into a pick-up coil as illustrated in FIG. 2. As shown, a ferrite alignment key 22 has recessed regions 24 to allow insertion of a pick-up coil 26. In this configuration, the ferrite alignment key 22 is positioned in and extends from the pick-up-coil 26.

As shown in both FIGS. 1 and 2, the ferrite alignment key's distal projection aligns the pick-up coil and the wireless resonant sensor. The resulting alignment is reproducible enabling an operator to replicate the alignment during sensor operation, specifically during insertion of the ferrite alignment key into the wireless sensor, within a preselected tolerance range.

The alignment key of the assembly reduces variation in signal response relative to systems that do not include an alignment key component. The reproducibility resulting from the enhanced alignment enables the user to perform multiparameter measurements that require accurate and reproducible sensor readings such as multivariate complex impedance detection.

Furthermore, the sensor excitation may be performed with one pick-up coil and signal collection may be done with the same or another pick-up coil. At least one pick-up coil has a ferrite alignment key.

In alternative embodiments, the ferrite alignment key is associated with a wireless resonant sensor rather than the pick-up coil. The wireless resonant sensor assembly may have a recessed region to allow insertion of a pick-up coil resulting in the ferrite alignment key being positioned in and extending from the pick-up coil during operation of the sensor and aligning the pick-up coil and the wireless resonant sensor.

The ferrite alignment key may be comprised of a ferrite material that has a high magnetic permeability, but is magnetically "soft" so that it does not retain a significant magnetic field when the external field is removed or rapidly changed. Nonlimiting examples of ferrite materials useful in the assemblies include manganese zinc, nickel zinc, manganese, and magnesium zinc that range in permeability for 20 to 10000 newtons per ampere squared. In some embodiments, the ferrite materials should tolerate use at frequencies ranging from 1 KHz to 100 MHz.

Representative wireless resonant sensors that may be used in the disclosed systems include, without limitation, analog or digital radio frequency identification (RFID) sensors, acoustic wave sensors and inductor-capacitor resonant circuit sensors. RFID sensors may contain an antenna coil for receiving and transmitting a radio frequency signal. The antenna performs sensing functions by changing its impedance parameters as a function of environmental changes. Exemplary RFID sensors have been described in US patent applications titled "Chemical and biological sensors, systems and methods based on radio frequency identification" Ser. No. 11/259,710 and "Chemical and biological sensors, systems and methods based on radio frequency identification" Ser. No. 11/259,711 incorporated herein by reference.

The wireless resonant sensor may further comprise an electronic tag for storing data. The electronic tag may comprise a memory microchip, which is connected to a sensor's antenna coil for communication with a pick-up coil assembly. The microchip can be read by illuminating the tag by an excitation signal. When the electronic tag is an RFID tag, the excitation signal is a radio frequency (RF) carrier signal, sent by a reader/writer. The memory microchip may comprise a digital identification chip (e.g., surface-acoustic wave chip or an integrated circuit memory chip) for storing a digital identity of the tag. The digital identification chip can store and process information and modulate and demodulate a radio frequency signal. The integrated circuit memory chip may also contain an input for an analog signal. When the RF field passes through an antenna coil, an AC voltage is generated across the coil. This voltage is rectified in the microchip of the RFID tag resulting in a DC voltage for the microchip operation. The microchip becomes functional when the DC voltage reaches a predetermined level. By detecting the RF signal backscattered from the microchip using a pick-up coil assembly, the information stored in the microchip can be fully identified. The memory microchip may also be used for sensing. For sensing, the microchip may contain an input for an analog signal or have a sensor incorporated into the microchip during the fabrication of the chip. In other applications, the RFID sensor response may be introduced into the microchip and the microchip communicates the status of the sensor during sensing operations.

The RFID sensors may further comprise a complementary sensor attached across the antenna and memory chip of the RFID tag. By attaching a complementary sensor to a RFID tag, electrical response of the attached sensor is translated into simultaneous change of complex impedance responses. The complex impedance responses include detecting changes in the, resonant frequency of the imaginary part of the complex impedance, antiresonant frequency of the imaginary part of the complex impedance, zero-reactance frequency, phase angle, and magnitude of impedance.

The multivariate detection of the complex impedance responses enabled by the present allows a single sensor to iteratively measure multiple parameters. The accuracy of the multiparameter measurement of the RFID sensor is increased by using the embodiments of the invention where alignment is fixed by a ferrite alignment key. The ferrite alignment key diminishes errors resulting from lack of alignment or rudimentary alignment of a pick-up coil assembly, without a key, and a RFID sensor.

The ferrite alignment key fixes the alignment of the pick-up coil and wireless resonant sensor enhancing the return signal and therefore signal detection. The return signal enhancement may be provided by (1) the fixed position of the pick-up coil in relation to the sensor, which improves the reproducibility of measurements over time and (2) the concentration of the electromagnetic field from the pick-up coil into the region of the sensor, which improves the signal-to-noise of sensor response.

Enhanced signal detection improves response stability over measurement time, reduces response noise, increases the signal magnitude, and increases the signal-to-noise ratio. The enhanced detection obtained in the present invention may also enable wireless resonant sensor to be designed with lower power requirements, smaller dimensions and greater sensing ranges than similar designs without an alignment key. Furthermore, the ferrite alignment key reduces positioning and repositioning errors between the sensor and pick-up coil enabling iterative multiparameter measurements.

Figure 3:
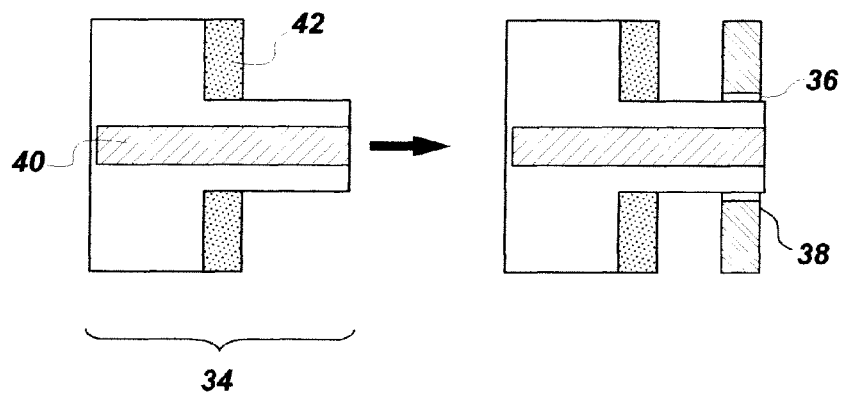

Enhanced signal detection enabled by the present invention may also improve multivariate detection by a single sensor. A single sensor can be used to iteratively measure multiple parameters through changes in complex impedance responses enabled by the present allows a single sensor to iteratively measure multiple parameters. The accuracy of the multiparameter measurement of the RFID sensor is increased by using the embodiments of the invention where alignment is fixed by a ferrite alignment key. The ferrite alignment key diminishes errors resulting from lack of alignment or rudimentary alignment of a pick-up coil assembly, without a key, and a RFID sensor FIG. 3 illustrates a pick-up coil and wireless sensor aligned using a lock-and-key type of alignment of a ferrite alignment key and a wireless resonant sensor. As shown in FIG. 3, a pick-up coil assembly 34 may be inserted into the receiving element 36 of an RFID sensor 38 such that the configuration of ferrite alignment key 40 aligns the pick-up coil 42 with the wireless remote sensor 38 during operation of the sensor. The lock-and-key configuration results in an alignment that may be reproduced upon reintroduction of the ferrite alignment key's distal projection into the wireless sensor.

Figure 4:
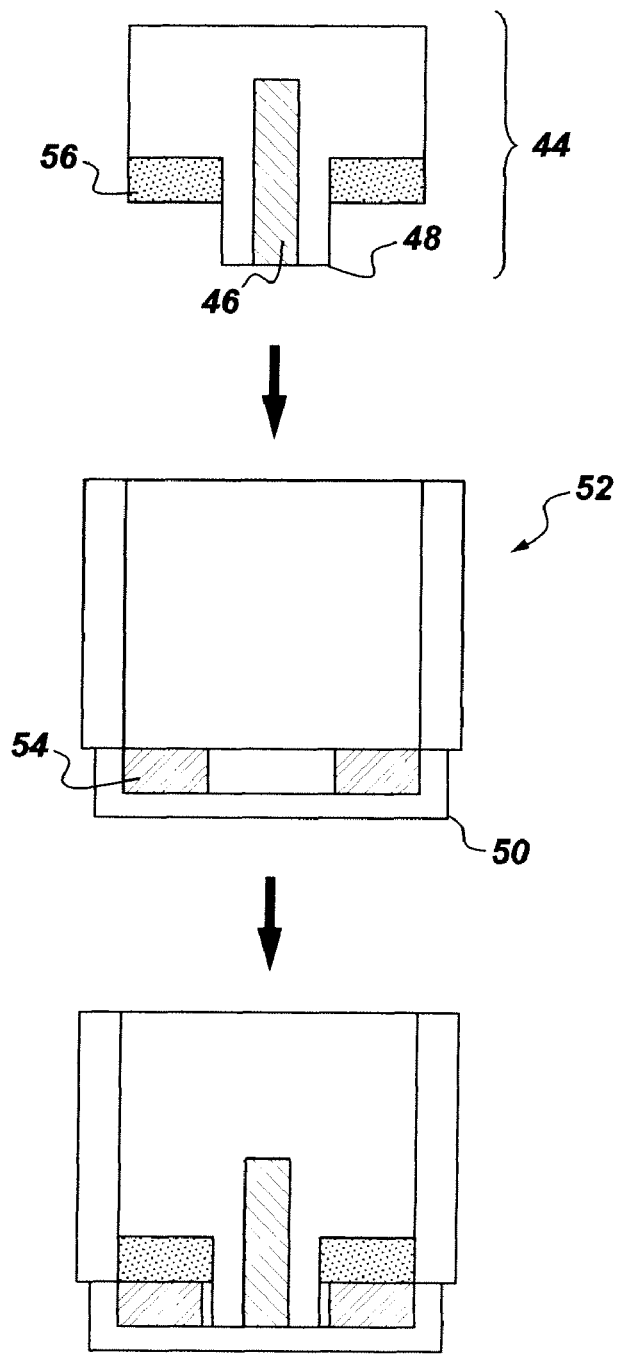

In a further embodiment as shown in FIG. 4, a pick-up coil assembly 44 is configured such that the ferrite alignment key 46 is fabricated comprising an alignment stop surface 48. The alignment stop surface corresponds with an alignment stop surface 50 of the receiving element 52 of the wireless resonant sensor 54. Contact between the alignment stop surfaces may increase the sensing of the sensor's signal by the pick-up coil 56. The contact between the alignment stop surfaces may be a non-galvanic contact, which results from inductive or magnetic coupling, and does not require direct connection with a metal wire.

The pick-up coil assembly may also be configured such that alignment between the pick-up coil and the wireless remote sensor occurs when the ferrite alignment key's distal projection is repositioned within the receiving element, for example by rotation. In another embodiment, the ability to impinge an excitation signal on the wireless resonant sensor or to detect the emitted return signal may be dependent on repositioning of the ferrite alignment key after insertion into the wireless resonant sensor. A repositioning restricted operation of the pick-up coil and the wireless remote sensor may provide added security by restricting reading/writing of the sensor.

Depending on the application, the wireless resonant sensor may be embedded in a monitoring system. A monitoring system includes, but is not limited to manufacturing, product supply, or security applications. The wireless resonant sensor is configured in such a way as to have a receiving element that is accessible to a pick-up coil comprising a ferrite alignment key having a distal projection.

The ferrite alignment key extends from the pick-up coil forming a distal projection. As such the length of the ferrite alignment key is greater than the length of the pick-up coil. The distal projection of the ferrite alignment key is compatible with the receiving element of the wireless remote sensor. The distal projection may be configured in a variety of shapes such as rectilinear, cylindrical, tapered, beam-type, or polygon in cross-section. The receiving element of the remote sensor may, but need not necessarily, be matched to the distal projection of the alignment key. In certain embodiments, the length of ferrite alignment key extending from the pick-up coil may be from 0.1 mm to 200 mm, more preferable from 0.5 mm to 150 mm, most preferable from 1 mm to 100 mm.

In one or more non-limiting examples, the wireless resonant sensor may be embedded in manufacturing, packaging, or monitoring components. Manufacturing components include, but are not limited to, vessels, bags, chambers, tubing, connectors, and columns. Packaging components include but are not limited to date sensitive materials such as food, drink, and pharmaceutical as well as durable goods. Monitoring components include, but are not limited to, environmental, surveillance, and industrial equipment. The wireless remote sensor may be employed to facilitate monitoring and control for in-line manufacturing. The wireless remote sensor may be a RFID sensor, acoustic wave sensor, or inductor-capacitor resonant circuit sensor.

In certain embodiments the wireless remote sensor may be either permanently attached or removably attached to the monitoring system. For example, in applications requiring re-calibration of the sensor after assembly, such as in the monitoring of a biopharmaceutical process, the sensor may be removably attached to a container, removed, re-calibrated, and then re-installed for operation.

Similarly, the pick-up coil assembly may be permanently attached or removable from the system such that during operation of the sensor the pick-up coil assembly is in a fixed position with the distal projection of the ferrite alignment key inserted into the receiving element of the wireless remote sensor. Once the operation of the sensor is complete, the distal projection may be removed from the receiving element of the sensor or remain engaged.

The pick-up coil may be attached to a reader/writer device. The reader/writer device may be used to write and read data into the memory of the memory chip and to read impedance of the antenna. The data may be sent to a display device or a controller.

In accordance with yet another aspect of the invention, methods of measuring one or more parameters of a monitoring system are provided using a wireless remote sensor with a pick-up coil having a ferrite alignment key in and extending from the pick-up coil. The method comprises the steps of embedding a wireless resonant sensor having a receiving element in a monitoring system and providing a pick-up coil in operative association with the wireless resonant sensor. The pick-up coil comprises a ferrite alignment key positioned in and extending from the pick-up coil to form a distal projection. The distal projection of the ferrite alignment key is inserted into the receiving element of the wireless resonant sensor during operation of the sensor. The pick-up coil picks up the sensor's signal. In certain embodiments, the signal may be read using a reader/writer device coupled to the pick-up coil.

In another embodiment the invention provides a method for measuring one or more parameters of a monitoring system comprising, embedding a wireless resonant sensor in the monitoring system wherein the wireless resonant sensor comprises a ferrite alignment key positioned in and extending from the wireless resonant sensor, providing a pick-up coil in operative association with the wireless resonant sensor and wherein the pick-up coil comprises a receiving element, inserting the ferrite alignment key into the receiving element of the pick-up coil such that the wireless resonant sensor and the pick-up coil are aligned, sensing the wireless resonant sensor signal with the pick-up coil, and reading the signal using a reader/writer device coupled to the pick-up coil.

EXAMPLES

In the following examples, measurements of the complex impedance of RFID sensors were performed using a network analyzer or a precision impedance analyzer (Agilent Technologies, Inc. Santa Clara, Calif.) under a computer control using LabVIEW. The analyzers were used to scan the frequencies over the range of interest (typically from ~10 to ~15 MHz) and to collect the complex impedance response from the RFID sensor. The collected complex impedance data was analyzed using Excel (MicroSoft Inc. Seattle, Wash.) or KaleidaGraph (Synergy Software, Reading, Pa.) and PLS_Toolbox (Eigenvector Research, Inc., Manson, Wash.) operated with Matlab (The Mathworks Inc., Natick, Mass.).

Digital ID readings from the memory micro-chips of RFID sensors were performed with several RFID readers that included a handheld SkyeTek reader, and a SkyeTek computer-controlled (using LabVIEW) reader, respectively (Model M-1, SkyeTek, Westminster, Colo.), a computer-controlled multi-standard RFID Reader/Writer evaluation module (Model TRF7960 Evaluation Module, Texas Instruments), or a Wave Logic Reader (Scotts Valley, Calif.).

A 3-mm diameter ferrite rod was used from Kreger Components, Inc. (Roanoke, Va.). The ferrite material was a high frequency NiZn ferrite operational to up to 50 MHz with permeability of 40 gauss.

Example 1

Affect of Ferrite Alignment Key Length on RFID Sensor Signal Intensity

A RFID tag from Sokymat USA (Cynthiana, Ky.) with an open center (about 5 mm opening) was used in combination with several ferrite alignment keys of different lengths (all 3-mm diameter ferrite rods).

Figure 5:
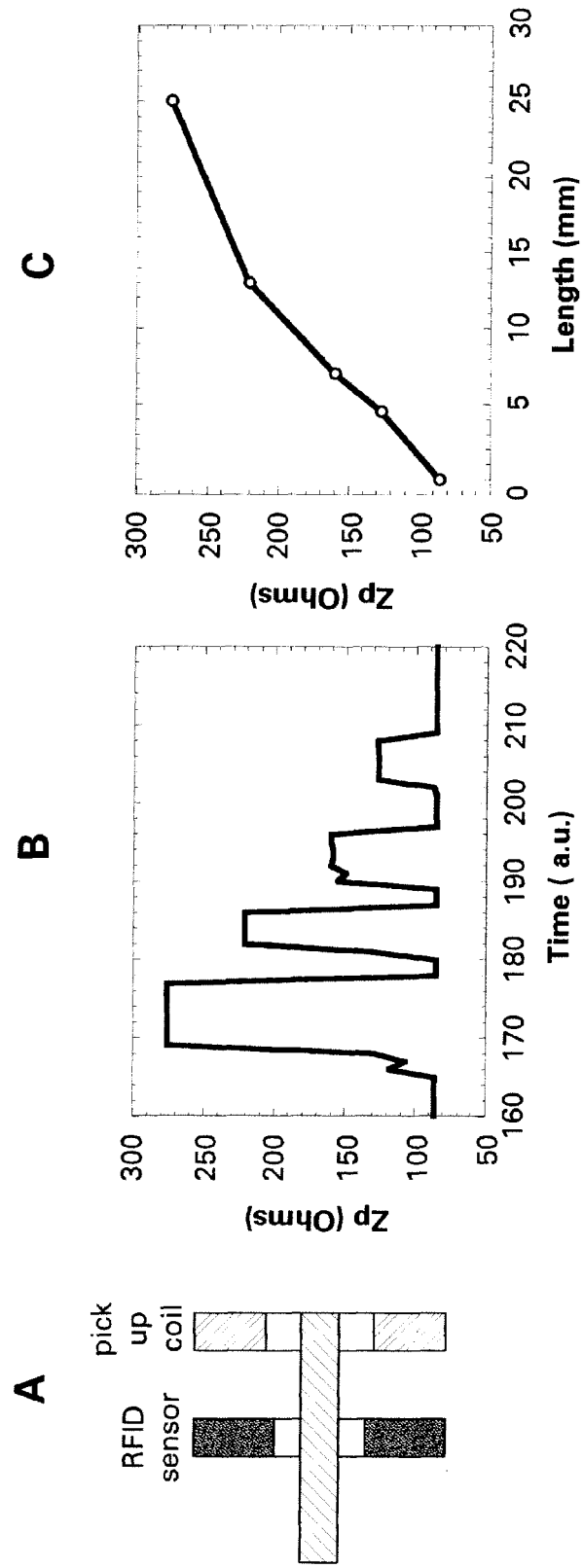
FIG. 5 shows sensor signal intensity as a function of the length of the ferrite alignment key.

FIG. 5A represents recorded measurement using ferrite alignment keys of different lengths upon inserted into both the RFID sensor and pick-up coil. The distance between the RFID sensor and pick-up coil was approximately 1 mm. The distance between the surface of the pick-up coil (opposite to the RFID sensor) and the edge of the ferrite alignment key was kept constant relatively negligible, D~0 mm. FIG. 5B shows sensor signal intensity upon testing of ferrite alignment keys of different lengths. FIG. 5C presents the summary of testing results that illustrate that the sensor signal intensity increases as a function of the length of the ferrite alignment key. Because the distance between the surface of the pick-up coil (opposite to the RFID sensor) and the edge of the ferrite alignment key was very little, the linear increase of the RFID sensor signal was observed with the increase of the length of the ferrite alignment key from 5 to 14 mm. The largest length of the length of the ferrite alignment key (25 mm) shows a noticeable saturation in signal increase.

Example 2

Pressure Sensing Assembly with a Ferrite Alignment Key

Figure 6:
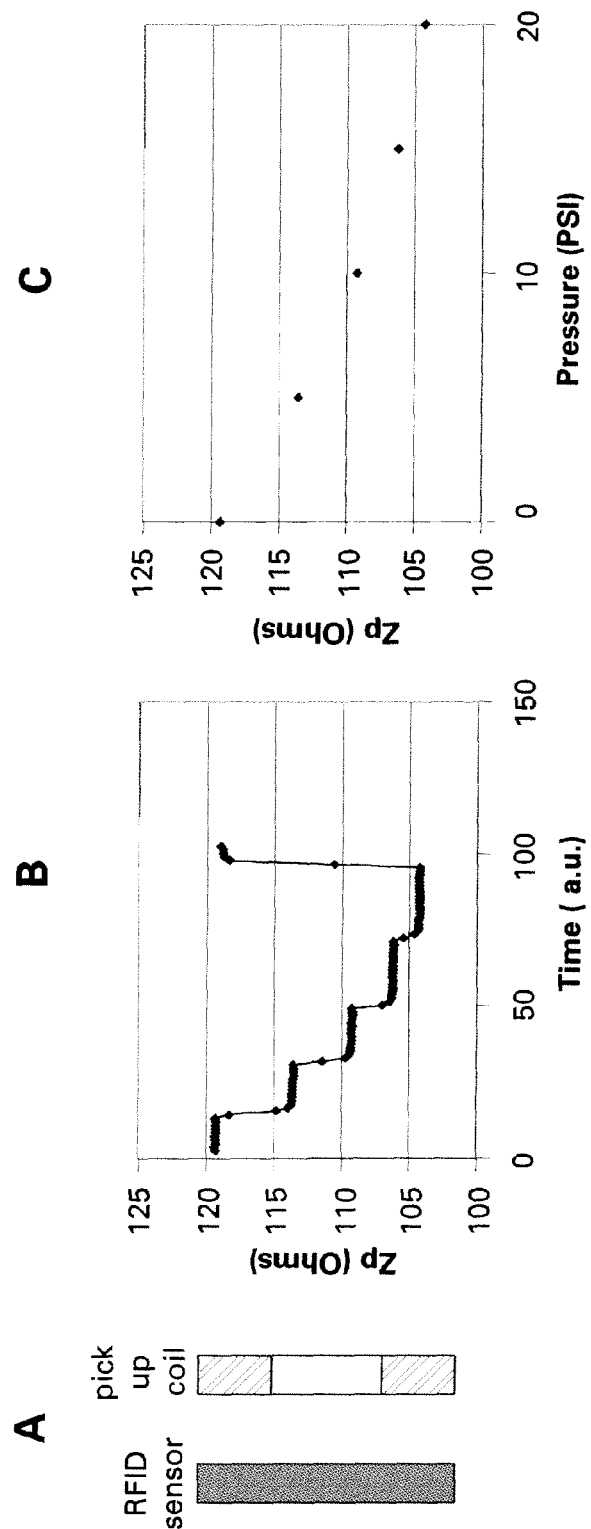
FIG. 6 shows measurements of a RFID pressure sensing assembly without a ferrite alignment key.

A RFID tag from TagSys USA, Inc., Doylestown, Pa. (about 9 mm in diameter) was used in combination with a ferrite insert rod 3-mm in diameter, 5 mm long. The RFID tag was converted into a pressure sensor by attaching a pressure sensitive film to a surface of RFID sensor. The other side of the flexible membrane was metalized. The applied pressure flexed the membrane and the amount of electromagnetic field quenching was related to the applied pressure. FIG. 6A illustrates a control experiment layout of the measurement assembly without a ferrite insert. The applied pressure onto the RFID sensor produced a reproducible signal change. The maximum signal change was 15 ohm with applied pressure of 15 PSI (FIG. 6B). The calibration curve of the pressure response is presented in FIG. 6C.

Figure 7:
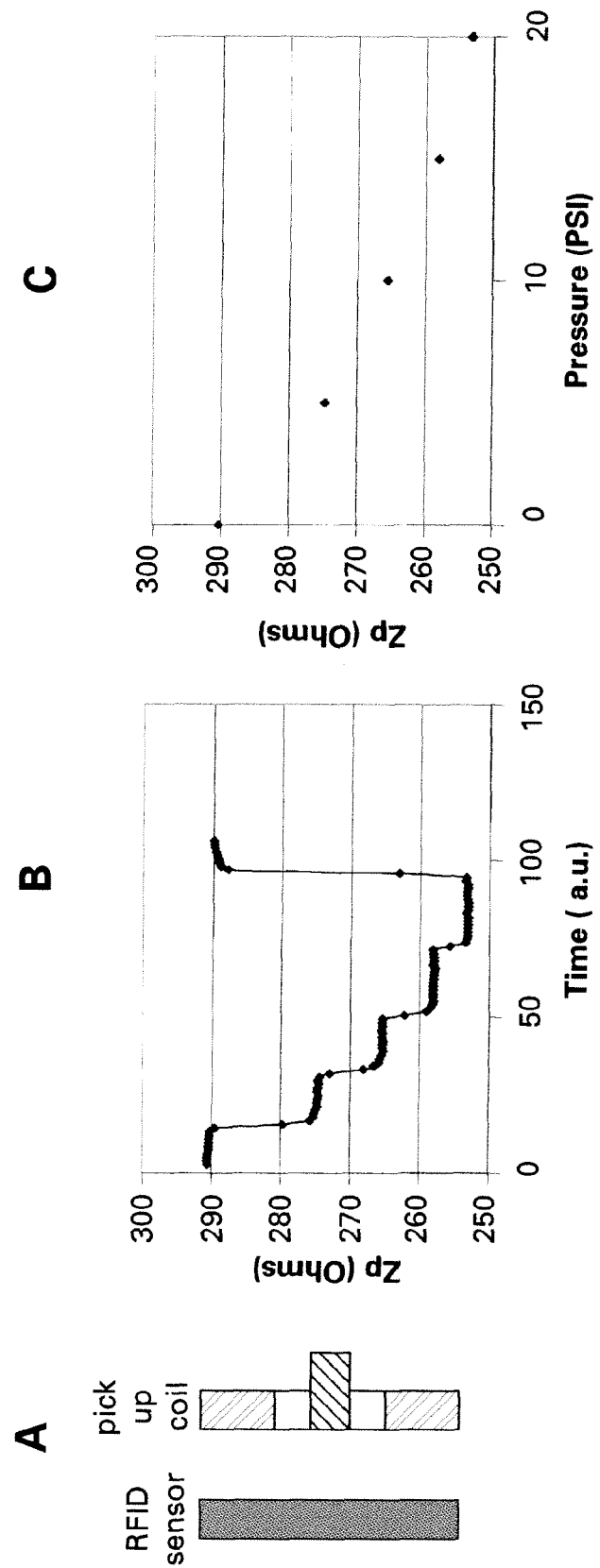
FIG. 7 shows measurements of a RFID pressure sensing assembly with a ferrite alignment key.

FIG. 7A illustrates an experiment layout of the measurement assembly with a ferrite insert. The applied pressure onto the RFID sensor produced a reproducible signal change. The maximum signal change was 37 ohm with applied pressure of 15 PSI (FIG. 7B). The calibration curve of the pressure response is presented in FIG. 7C.

The data illustrates that by using a ferrite key, a sensor signal dynamic range was improved from 15 ohm to 37 ohm (more than 100% signal improvement) with applied pressure of 15 PSI The invention may be embodied in other specific forms without departing from the spirit or essential characteristics thereof. The foregoing embodiments are therefore to be considered in all respects as illustrative rather than limiting on the invention described herein. The scope of the invention is thus indicated by the appended claims rather than by the foregoing description, and all changes that come within the meaning and range of equivalency of the claims are therefore intended to be embraced therein.

The invention claimed is:

1. A wireless resonant sensor assembly comprising:
    a pick-up coil;
    a ferrite alignment key positioned in and extending from the pick-up coil wherein said ferrite alignment key has an alignment stop surface;
    a wireless resonant sensor having a receiving element wherein said receiving element has an alignment stop surface corresponding with the alignment stop surface of the ferrite alignment key; and
    wherein the pick-up coil and the wireless resonant sensor align upon insertion of the ferrite alignment key into the receiving element and contact between the alignment stop surfaces increases the sensing of the wireless resonant sensor signal by the pick-up coil.

2. The assembly of claim 1 wherein the wireless resonant sensor is an RFID sensor, acoustic wave sensor, or inductor-capacitor resonant circuit sensor.

3. The assembly of claim 1 wherein the ferrite alignment key is configured such that insertion into the receiving element increases the sensing of the wireless resonant sensor signal.

4. The assembly of claim 3 wherein the increase sensing of the wireless resonant sensor signal by the pick-up coil comprises improved response stability over measurement time, reduction of response noise, increase of the signal magnitude, increase in the signal-to-noise ratio, and combinations thereof.

5. The assembly of claim 1 wherein the ferrite alignment key is configured to be repositioned within the receiving element for non-galvanic contact to occur between the alignment stop surfaces.

6. The assembly of claim 1 further comprising a reader/writer device coupled to the pick-up coil.

7. The assembly of claim 1 wherein the wireless resonant sensor assembly is for use in a monitoring system.

8. A wireless resonant sensor assembly comprising:
    a wireless resonant sensor;
    a ferrite alignment key positioned in and extending from the wireless sensor wherein said ferrite alignment key has an alignment stop surface; and
    a pick-up coil having a receiving element wherein said receiving element has an alignment stop surface corresponding with the alignment stop surface of the ferrite alignment key; and
    wherein the wireless resonant sensor and the pick-up coil align upon insertion of the ferrite alignment key into the receiving element and contact between the alignment stop surfaces increases the sensing of the wireless resonant sensor signal by the pick-up coil.

9. The assembly of claim 8 wherein the wireless resonant sensor is an RFID sensor, acoustic wave sensor, or inductor-capacitor resonant circuit sensor.

10. The assembly of claim 8 wherein the ferrite alignment key is configured such that insertion of the distal projection element into the receiving element increases the sensing of the wireless resonant sensor signal.

11. The assembly of claim 10 wherein the increase sensing of the wireless resonant sensor signal by the pick-up coil comprises improved response stability over measurement time, reduction of response noise, increase of the signal magnitude, increase in the signal-to-noise ratio, and combinations thereof.

12. The assembly of claim 8 wherein the ferrite alignment key is configured to be repositioned within the receiving element for non-galvanic contact to occur between the alignment stop surfaces.

13. The assembly of claim 8 further comprising a reader/writer device attached to the pick-up coil.

14. A method for measuring one or more parameters of a monitoring system comprising:
    embedding a wireless resonant sensor in the monitoring system wherein the wireless resonant sensor comprises a receiving element;
    providing a pick-up coil, in operative association with the wireless resonant sensor, and a ferrite alignment key position in and extending from the pick up coil;

inserting the ferrite alignment key into the receiving element of the wireless resonant sensor and contacting an alignment stop surface on the ferrite alignment key with a corresponding alignment stop surface of the receiving element such that the pick-up coil and the wireless resonant sensor align;

sensing the wireless resonant sensor signal with the pick-up coil; and reading the signal using a reader/writer device coupled to the pick-up coil; and whereby the contacting increases the sensing of the wireless resonant sensor.

15. The method of claim 14 wherein the one or more parameters comprises at least one of identification, physical, chemical, and biological properties.

16. The method of claim 15 wherein the wireless resonant sensor is an RFID sensor, acoustic wave sensor, or inductor-capacitor resonant circuit sensor.

17. The method of claim 15 wherein the inserting step increases the sensing of the wireless resonant sensor.

18. The method of claim 17 wherein the increase sensing of the wireless resonant sensor comprises improved response stability over measurement time, reduction of response noise, increase of the signal magnitude, increase in the signal-to-noise ratio, and combinations thereof.

19. The method of claim 15 wherein the ferrite alignment key is configured to be repositioned within the receiving element for non-galvanic contact to occur between the alignment stop surfaces.

20. A method for measuring one or more parameters of a monitoring system comprising:

embedding a wireless resonant sensor in the monitoring system wherein the wireless resonant sensor comprises a ferrite alignment key position in and extending from the wireless resonant sensor;

providing a pick-up coil in operative association with the wireless resonant sensor and wherein the pick-up coil comprises a receiving element;

inserting the ferrite alignment key into the receiving element of the pick-up coil and contacting an alignment stop surface on the ferrite alignment key with a corresponding alignment stop surface of the receiving element such that the wireless resonant sensor and the pick-up coil are aligned;

sensing the wireless resonant sensor signal with the pick-up coil; and reading the signal using a reader/writer device coupled to the pick-up coil; and whereby the contacting increases the sensing of the wireless resonant sensor signal by the pick-up coil.

21. The method of claim 20 wherein the one or more parameters comprises at least one of identification, physical, chemical and biological properties.

22. The method of claim 20 wherein the wireless resonant sensor is an RFID sensor, acoustic wave sensor, or inductor-capacitor resonant circuit sensor.

23. The method of claim 21 wherein the inserting step increases the sensing of the wireless resonant sensor.

24. The method of claim 23 wherein the increase sensing of the wireless resonant sensor comprises improved response stability over measurement time, reduction of response noise, increase of the signal magnitude, increase in the signal-to-noise ratio, and combinations thereof.

25. The method of claim 20 wherein the ferrite alignment key is configured to be repositioned within the receiving element for non-galvanic contact to occur between the alignment stop surfaces.

* * * * *